United States Patent [19]
Cox et al.

[11] Patent Number: 4,972,149
[45] Date of Patent: Nov. 20, 1990

[54] ELECTROMAGNETIC PROPAGATION THIN BED RESISTIVITY WELL LOGGING SYSTEM AND METHOD

[75] Inventors: Percy T. Cox; Wayne F. Warren; Theodore W. Nussbaum; Donald L. Johnson, Jr., all of Houston, Tex.

[73] Assignee: Texaco Inc., White Plains, N.Y.

[21] Appl. No.: 890,209

[22] Filed: Jul. 28, 1986

Related U.S. Application Data

[63] Continuation-in-part of Ser. No. 735,007, Feb. 17, 1985, abandoned.

[51] Int. Cl.$^5$ ............................................. G01V 3/28
[52] U.S. Cl. .................................................... 324/339
[58] Field of Search ................... 324/332–335, 324/338–344, 345, 346

[56] References Cited

U.S. PATENT DOCUMENTS

| | | | |
|---|---|---|---|
| 3,993,944 | 11/1976 | Meador et al. | 324/339 X |
| 4,100,483 | 7/1978 | Thompson et al. | 324/341 |
| 4,107,597 | 8/1978 | Meador et al. | 324/339 X |
| 4,130,793 | 12/1978 | Bridges et al. | 324/341 |
| 4,291,267 | 9/1981 | Bonnet | 324/54 |
| 4,319,191 | 3/1982 | Meador et al. | 324/338 X |
| 4,319,192 | 3/1982 | Chemali et al. | 324/339 X |
| 4,401,947 | 8/1983 | Cox | 324/338 |
| 4,427,941 | 1/1984 | Riedesel, Jr. et al. | 324/338 X |
| 4,451,789 | 5/1984 | Meador | 324/335 X |
| 4,472,684 | 9/1984 | Schuster | 324/339 |
| 4,532,614 | 7/1985 | Peppers | 324/369 X |
| 4,687,995 | 8/1987 | Warren et al. | 324/341 |

OTHER PUBLICATIONS

Grubb et al., "Borehole Measurements of Conductivity and Dielectric Constant in the 300 kHz to 2 MHz Frequency Range", *Radio Science*, vol. 11, No. 4, Apr., 1976, pp. 275–283.

*Primary Examiner*—Reinhard J. Eisenzopf
*Assistant Examiner*—Warren S. Edmonds
*Attorney, Agent, or Firm*—Robert A. Kulason; James J. O'Loughlin; Ronald G. Gillespie

[57] ABSTRACT

The present invention is a thin bed resistivity well logging system and method which includes a transmitter transmitting electromagnetic energy into an earth formation, from within a borehole traversing the earth's formation, at a frequency lying within a range of frequencies from 500 kilohertz to 4 megahertz. The system, a portion of which is located in the borehole, determines the true resistivity of a thin strata in accordance with the transmitted electromagnetic energy that has propagated through the earth's formation.

8 Claims, 6 Drawing Sheets

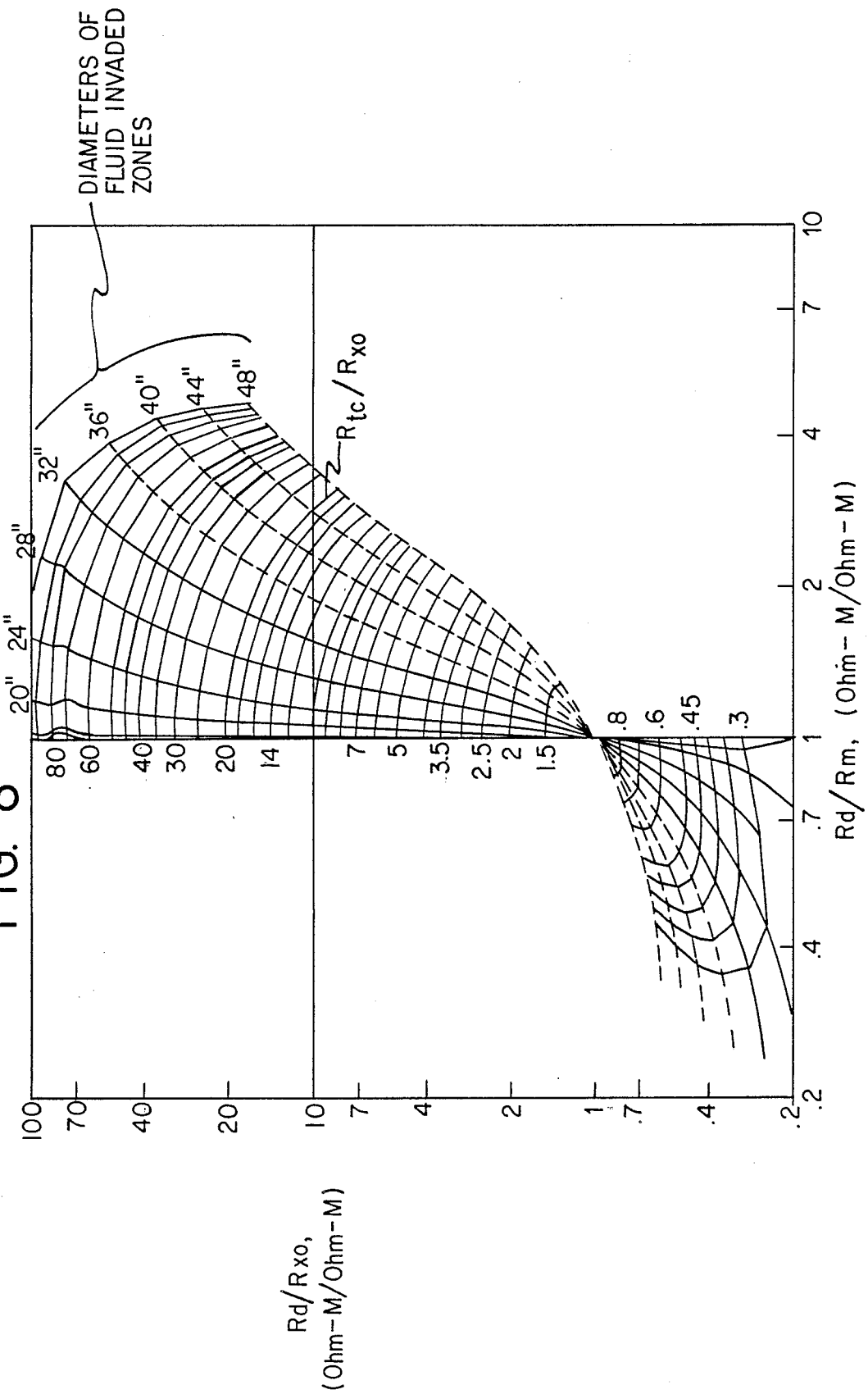

ELECTROMAGNETIC PROPAGATION THIN BED RESISTIVITY WELL LOGGING SYSTEM AND METHOD

REFERENCE TO RELATED APPLICATIONS

This application is a continuation-in-part of the copending application of the same inventors filed on Feb. 17, 1985 under Ser. No. 735,007, now abandoned. The applicants' Ser. No. 735,007 claims the benefit of the priority filing date of Feb. 17, 1985 as to any subject matter which has been disclosed or claimed in said application Ser. No. 735,007 and present in this application.

BACKGROUND OF THE INVENTION

1. Field of the Invention

The present invention relates to well logging systems and method in general and, more particularly, to resistivity well logging systems and methods.

SUMMARY OF THE INVENTION

The present invention is a thin bed resistivity well logging system and method which includes a transmitter which transmits electromagnetic energy into an earth formation from within a borehole traversing the earth's formation at a frequency lying within a range of frequencies from 500 kilohertz to 4 megahertz. The system, a portion of which is located in the borehole, determines the true resistivity of a thin strata in accordance with the transmitted electromagnetic energy that has propagated through the earth's formation.

The objects and advantages of the invention will be described more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 8 is an Invasion Correction chart derived for the second embodiment of the present invention.

DESCRIPTION OF THE INVENTION

One of the continuing well logging problems is accurate water saturation and reserve calculations in thin hydrocarbon-bearing beds. Hydrocarbon-bearing beds can be quite thin, with thickness measurements ranging from 6 inches to ten feet being common in some reservoirs. In certain south Louisiana reservoirs, thin hydrocarbon-bearing sands are laminated with very low resistivity shales. These high resistivity sand-low resistivity shale laminations appear as low resistivity zones on standard induction resistivity logs. Good production is possible from these "low resistivity pay" zones even though the standard induction logs measure only 1-2 ohm-meters over the interval. The same conditions exist in several areas of California where turbidite flows have resulted in thin sand-shale laminations where significant production is made from zones that do not seem to be good prospects by standard induction logging analysis. The cause of the problem in thin beds is that logs which "see" deep enough to detect the true formation resistivity such as the deep and medium induction tools, do not have the vertical resolution necessary to allow full development in thin beds. The present invention provides the required vertical resolution while simultaneously providing a measurement from deep in the formation.

Figure 1:
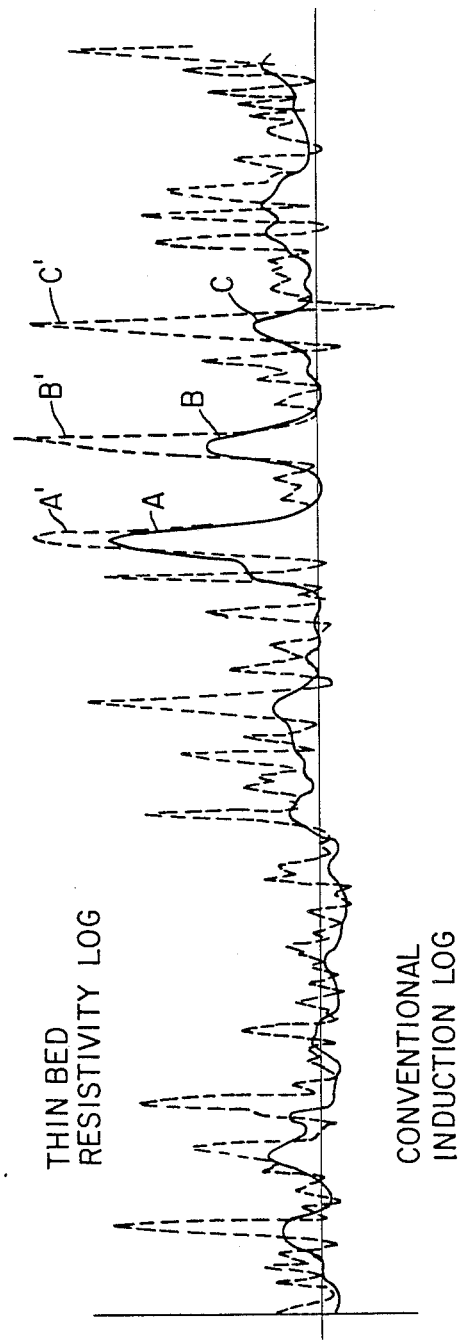
FIG. 1 is a graphical representation of actual well logs comparing a deep induction resistivity well logging system and a thin bed resistivity well logging system constructed in accordance with the present invention.

With reference to FIG. 1, there is shown two well logs, one (solid line) was made using a conventional deep induction log such as is commercially available from well log service companies, and the second log (dashed line) was made using the thin bed resistivity well logging system of the present invention. It should be noted that in regards to the three peaks identified as A, B and C, of the deep seeing conventional logging system, peak A looks good from a hydrocarbon production viewpoint but peaks B and C do not look like those intervals would be as productive. Zones B and C, being progressively thinner than zone A, are seen by the standard induction log as progressively lower resistivities. On the other hand, the well logging system of the present invention produced peaks A', B' and C', which show that all three intervals of the formation appear to be hydrocarbon-bearing formations. Thus, an operator basing judgment on the standard induction well logging system and method, would probably only initiate production in the interval represented by peak A, whereas on the basis of the present invention's logs, he would initiate petroleum recovery operations in intervals associated with peaks A', B' and C'. The system of the present invention while having excellent vertical resolution, also looks deep into the formation to obtain the true formation resistivity for thin bed formations.

The present invention achieves this capability by propagating electromagnetic energy into the formation at a frequency within the range of half a megahertz up to four megahertz, with the preferred operating frequency of two megahertz and with the spacing between the transmitter and the receiver coils and the spacing between the two receiver coils as hereinafter explained.

Figure 2:
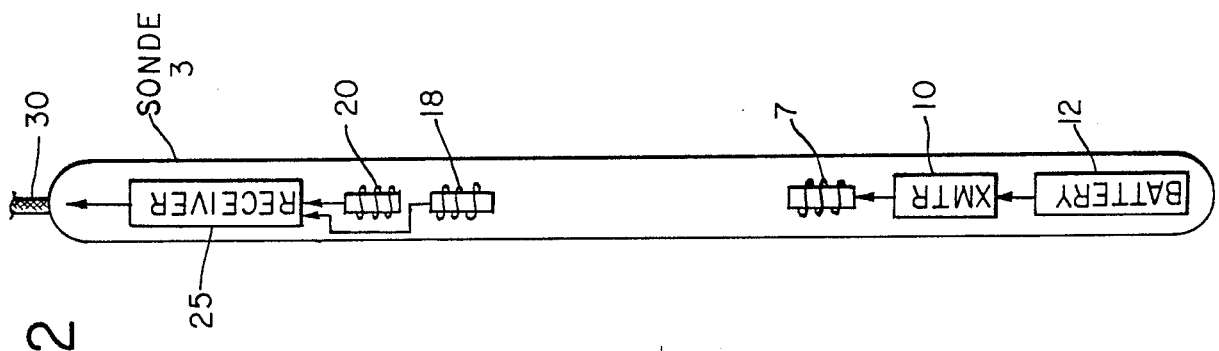
FIG. 2 depicts the transmitter coil and receiver coils arrangement in a well logging sonde in accordance with one embodiment of the present invention.

With reference to FIG. 2, there is shown a well logging sonde 3 having a transmitter coil 7 energized by transmitter means 10 receiving power from a battery 12. The mid-point of a receiver coil 18 is located a distance of 43 inches from mid-point of transmitter coil 7. Further, another receiver coil 20 has its mid-point spaced 49 inches from the mid-point of transmitter coil 7. Thus, the distance from mid-point of receiver coil 18 to mid-point of receiver coil 20 is 6 inches. Receiver coils 18 and 20 receive the electromagnetic energy that has propagated through the formation and provides corresponding signals to receiver electronics 25.

Receiver electronics 25 provides a signal to the surface by way of a conventional well logging cable 30.

Figure 3:
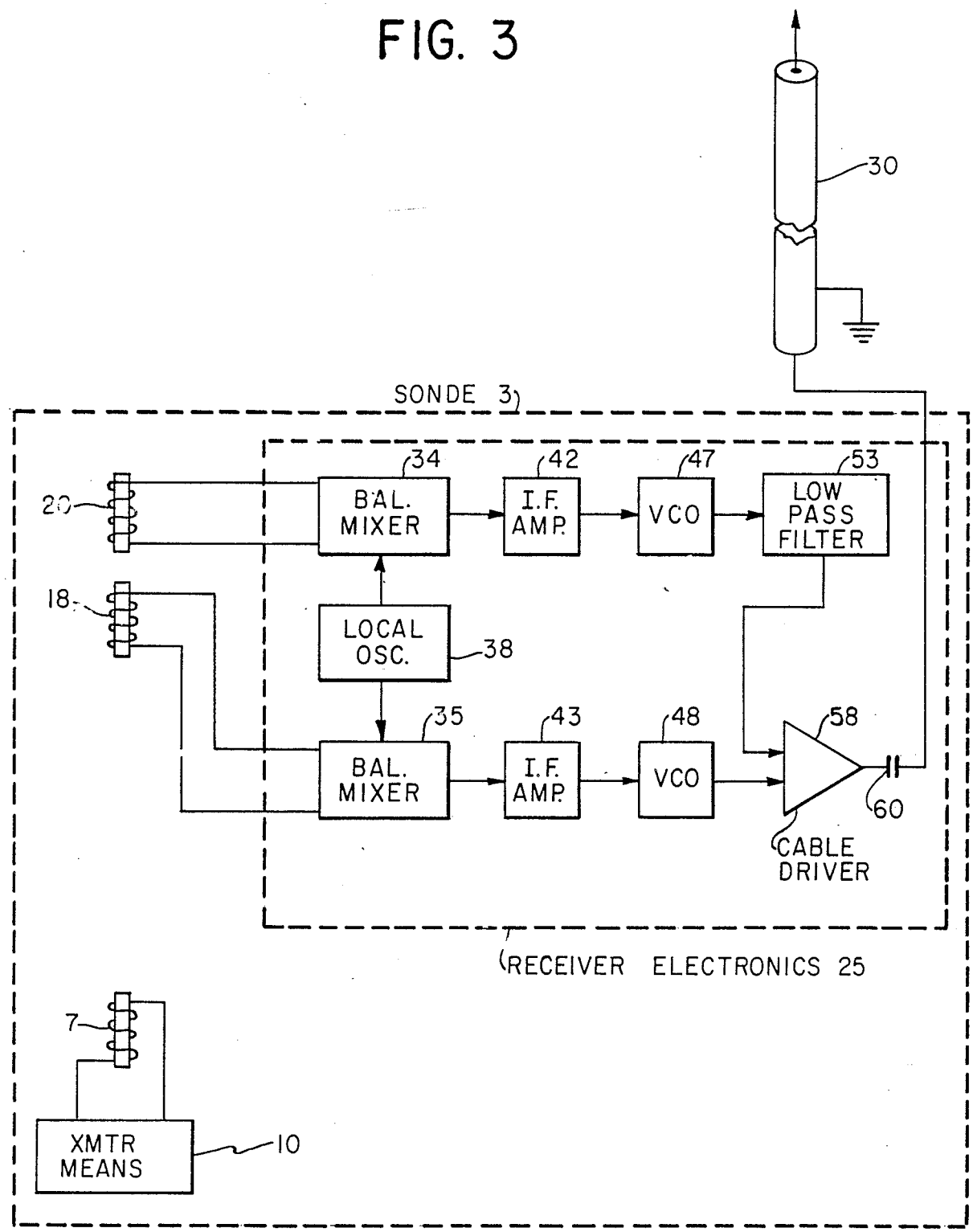
FIGS. 3 and 4 combined presents a simplified block diagram of a thin bed well logging system in accordance with the one embodiment of the present invention.

Referring to FIG. 3, the signals from receiver coils 18, 20 are processed in a conventional manner, namely they are provided to balanced mixers 35 and 34, respectively, where the 2 megahertz signals are heterodyned to a lower frequency (preferably 2 kilohertz) by action of a local oscillator 38. The signals from mixers 34 and 35 are provided to IF amplifiers 42 and 43, respectively which in turn provide their amplified signals to voltage controlled oscillators 47 and 48, respectively. The signal from voltage controlled oscillator 47 is provided to a low pass filter 53 which passes the lower frequency signals to a cable driver 58 also receiving the signal from voltage control oscillator 48. Cable driver 58 in effect combines the two signals and provides them to a blocking capacitor 60 through the inner conductor of a well logging cable 30 whose armored shield is grounded.

Figure 4:
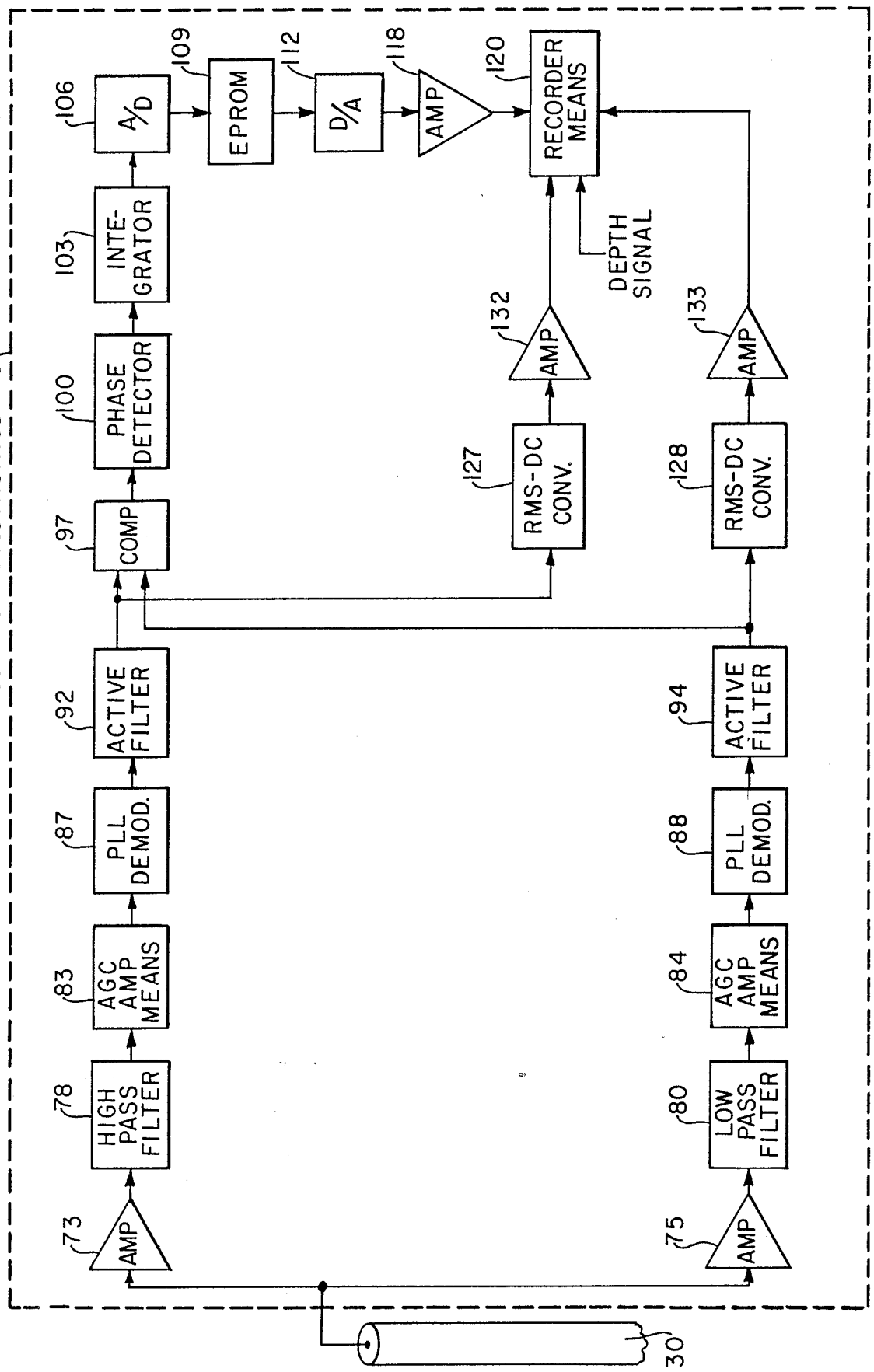

With reference to FIG. 4, surface electronics 70 includes amplifiers 73 and 75 amplifying the signal from well logging cable 30 and provides the amplified signals to a high pass filter 78 and a low pass filter 80, respectively. The effect of high pass filter 78 and low pass filter 80 is to separate the signals according to receiver coil so that in effect the signal provided by high pass filter 78 corresponds to the signal provided by coil 18, while the signal provided by low pass filter 80 corresponds to the signal provided by coil 20. The signals from high pass filter 78 and low pass filter 80 are provided to automatic gain control amplifier means 83 and 84, respectively, which in turn provides the amplified signals to phase-lock-loop demodulators 87 and 88, respectively, so as to reconstitute the signals from receiver coils 18 and 20, respectively. The signals from phase lock loop demodulators 87 and 88 are provided to active filter 92 and 94. The outputs of filters 92 and 94 are provided to a comparator 97 which provides a signal to phase detector 100. Phase detector 100 provides a signal representative of the phase difference between the two signals provided by filters 92 and 94 to an integrator 103. Integrator 103 provides the integrated signal to an analog-to-digital converter 106, which in turn provides digital signals to EPROM 109. EPROM 109, as its name title indicates, is an erasable programmable read-only memory which has stored in it information related to resistivity values in a manner so that the digital phase signal selects the proper resistivity value associated with that phase difference. The digital signal representative of the resistivity values from EPROM 109 are provided to a digital-to-analog converter 112 where they are converted into an analog signal representative of the formation resistivity. The analog signal from digital-to-analog converter 112 is provided to an amplifier 118 which in turn provides an amplified signal to recorder means 120. Recorder means 120 is a conventional analog chart recorder means receiving a depth signal or depth pulses which are provided in a conventional manner by the sheave wheels used in raising and lowering the well logging sonde 3. All of the foregoing relating to the depth signal is well known in the art and is not shown except to show that there is a signal for convenience of description.

The signals from active filters 92 and 94 are also provided to RMS-DC converters 127 and 128 which provide DC signals to amplifiers 132 and 133, respectively. Amplifiers 132 and 133 provide signals to recorder means 120 representative of the signals' amplitudes received by receiver coils 18 and 20, respectively.

One embodiment of the present invention as hereinbefore described is a thin bed resistivity well logging tool, very well suited for the measurement of well logging formations involving thin producing beds.

In another embodiment of the invention, the system and method not only measure thin bed resistivity, but also provide information relating to two other parameters: the movable oil estimate for the formation, and the invasion correction for the resistance of the thin beds. However, the invasion correction for the resistance of the thin beds require alteration to the sonde and surface equipment previously disclosed and discussed for the first embodiment. The movable oil estimate can be accomplished with the equipment of the first embodiment.

When a well is drilled, a special fluid called mud, is pumped down through the drill string. One of the basic purposes of the mud is to coat the wellbore to stabilize it. To form this coating, the mud must give up part of its fluid to the formation. As this fluid invades the formation, it can displace the connate fluids which may be oil or water, or both. This invasion of the mud filtrate changes the resistivity of the portion of the formation immediately surrounding the borehole, which is called the flushed zone. The extent of this flushed zone depends on many parameters, including the type of mud, pressure differential, and permeability and porosity of the formation.

Estimation of the movable oil (MOS) may be made by using the following equation which is disclosed at page 30 of *Essentials of Modern Open-Hole Log Interpretation* by John T. Dewan, PennWell Publishing Co. (Tulsa-1983).

$$MOS = C(\sqrt{R_{mf}/R_{xo}} - \sqrt{R_w/R_t})/\phi$$

where $R_{mf}$ is the resistivity of the mud filtrate, $R_{xo}$ is the resistivity of the flushed zone, $R_w$ is the resistivity of the connate water, $R_t$ is the resistivity of the uninvaded zone, $\phi$ is the porosity of the formation, and C is a constant which equals 1.0 for carbonate formations and 0.9 for sandstone formations. The above equation is the difference between the flushed zone water saturation and the uninvaded water saturation. The terms $R_{xo}$, $R_t$ and $\phi$ are found from wire line measurements, $R_{mf}$ from mud analysis and $R_w$ from field experience or estimated from logs. The $R_t$ provided by the present invention makes the movable oil estimation for thin bed (less than 10 feet) which was routinely made for the beds having thicknesses greater than 10 feet.

In the invasion correction for $R_t$ (thin bed), it is noted that the well logging tool and method as described in the first embodiment, is shown to have excellent vertical resolution.

Figure 5:
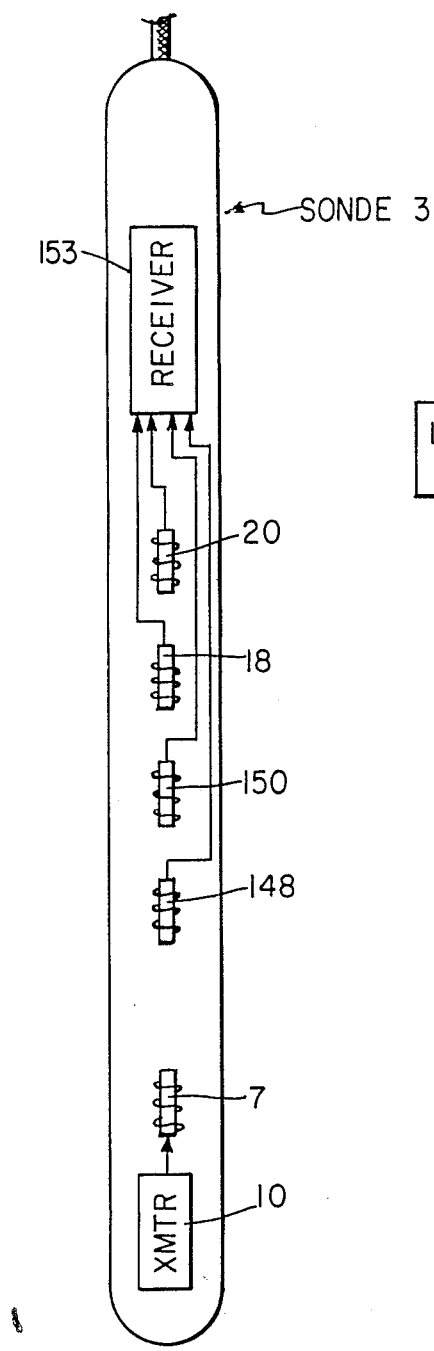
FIG. 5 depicts the transmitter coil and receiver coils arrangement in a well logging sonde in accordance with a second embodiment of the present invention.

However, some formations have beds so thin that in the aforementioned first embodiment well logging tool measured resistivities will be in error. The second embodiment allows the method of correcting these resistivities by adding a second set of receiver coils. In reference to FIG. 5 it is seen that additional receiver coils 148 and 150 have been added to sonde 3. Receiver coils 18 and 20 have new spacings of 60 inches and 66 inches, respectively, from their mid-points to the mid-point of transmitter coil 7. Thus there still is a distance of 6 inches between the mid-points of receiver coils 18 and 20. The mid point of receiver coil 148 is 42 inches away from the mid point of transmitter coil 7, while the mid point of receiver coil 150 is 48 inches away from the mid point of transmitter coil 7, so that there is a distance of 6 inches between the mid points of receiver coils 148 and 150.

Figure 6:
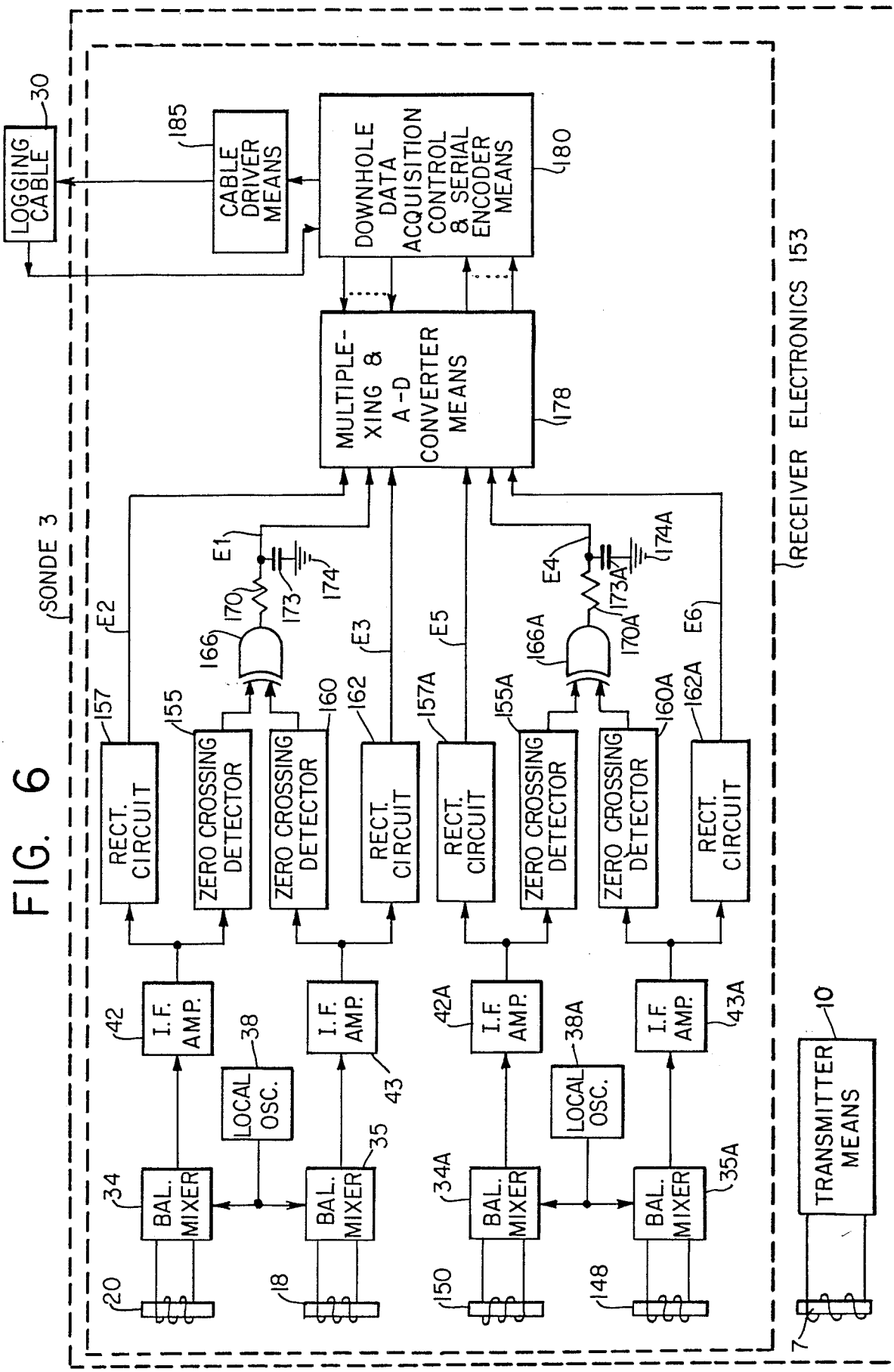

With reference to FIG. 6, elements 7, 10, 18, 20, 34, 35, 38, 42, and 43 operate as hereinbefore described for the first embodiment. IF amplifier 42 provides its signal to a zero crossing detector 155 and to a rectifying circuit 157. Similarly, IF amplifier 43 provides its signal to a zero crossing detector 160 and to a rectifying circuit 162. The outputs of zero crossing detectors 155, 160 are provided to an exclusive OR gate 166 which in turn provides its output to the pulse shaping circuit having a resistor 170 connected to exclusive OR gate 166 and to a capacitor 173. Capacitor 173 is also connected to ground 174. The output from exclusive OR gate 166 provided to the resistor 170 causes a signal E1 to appear at the junction of resistor 170 and capacitor 173. Signal E1 corresponds to the phase difference between the signals received by coils 18 and 20.

Rectifier circuit 157 provides a signal E2 corresponding to the amplitude of the signal at receiver coil 20. Similarly, rectifying circuit 162 provides a signal E3 representative of the amplitude of the signal received by receiver coil 18.

Similarly coils 148, 150 provide their signals to balanced mixers 35A and 34A, respectively. It should be noted that an element having an alpha-numeric designation is connected and operates in the same manner as any element having the same numeric designation without the alpha suffix. Signal E4 occurring at the connection of resistor 170A and capacitor 173, represents the phase difference between the signals received by coils 148 and 150. Rectifier circuit 157A provides a signal E5 corresponding to the amplitude of the signal provided by transmitter coil 70 and received by receiver coil 150. Rectifier circuit 162A provides a signal E6 representative of the amplitude of the signal provided by transmitter coil 7 and received by receiver coil 148.

Signals E1 through E6 are provided to multiplexing and A-to-D converter means 178, which in turn multiplexes signals E1 through E6 and provides corresponding digital signals to downhole data acquisition control and serial encoder means 180 which in turn also provides back to multiplexing and A-to-D converter means 178 digital signals. The multiplexing portion of means 178 may be of the type manufactured by Harris Semiconductor, as their part number HI-506-2, while the analog-to-digital converter portion may be of the type manufactured by Analog Devices as their part number AD-7578. Downhole data acquisition control and serial encoder means 180 may be a microprocessor manufactured by Motorola as their part number 6802. The serial encoded signal is provided to cable driver means 185 which in turn applies a signal to logging cable 30.

Figure 7:
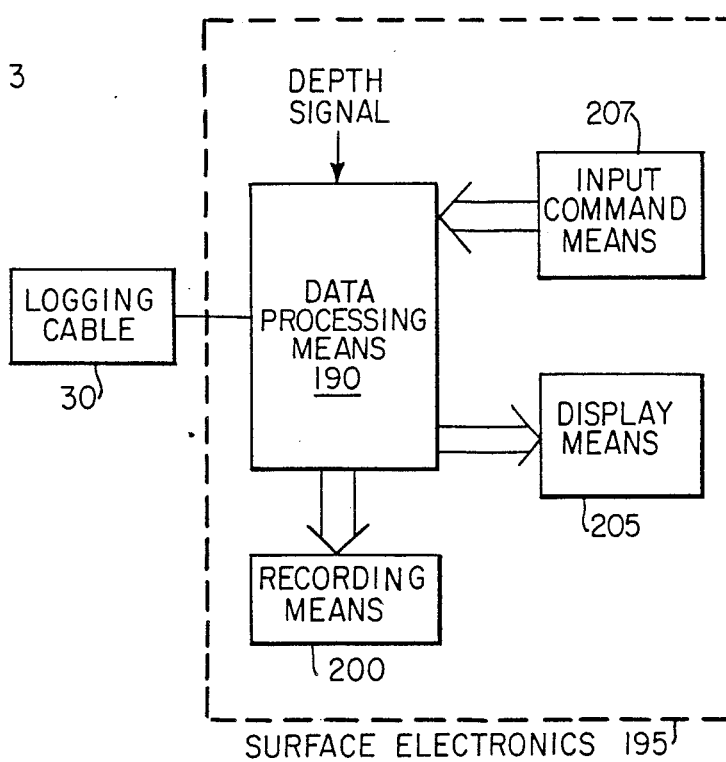
FIGS. 6 and 7 combined present a simplified block diagram of a thin bed well logging system in accordance with the second embodiment of the present invention.

With reference to FIG. 7, logging cable 30 provides the serial encoded signal to data processing means 190 of surface electronics 195. Data processing means 190 is a mini-computer which includes a central processing unit which may be of the type manufactured by Motorola as their part number 6802 and an arithmatic processing unit, which may also be of the type manufactured by Motorola as their part number 8231. Data processing means 190 calculates the resistivity $R_m$, from the phase difference between the signals received by coils 148 and 150, and $R_d$ from the phase difference between signals received by coils 18 and 20. It also determines the movable oil estimation calculated in accordance with the equation hereinbefore mentioned if $R_{xo}$ data is provided. Data processing means 190 also receives a depth signal which is provided in the conventional manner well known in the well logging industry and corrects the data for depth shift.

Further, data processing means 190 provides signals corresponding to the amplitudes of signals E2, E3, E5 and E6, signals relating to the phase difference as represented by signals E1 and E4, and signals related to the resistivity of the phase difference between coils 18 and 20 and 148 and 150, respectively. These signals are provided by data processing means to recording means 200. Similar signals in digital form are provided to display means 205, which is located in the front panel of an operator's console (not shown). The operator's console also includes input command means 207 through which an operator can provide signals to data processing means 190 for sending downhole by way of logging cable 30 to downhole data acquisition control, and serial encoder means 180 in sonde 3.

With reference to FIG. 8, there is shown a chart for Invasion Correction which, when utilized in accordance with the present invention, yields the diameter of the fluid invasion of the formation and the true resistivity of the formation beyond the invaded zone. Data processing means 190 would include conventional means for interpreting the chart in which $R_d$ is the resistance derived from the phase difference between the signals provided by receiver coils 18 and 20, $R_m$ is the resistivity derived from the phase difference between the signals provided by receiver coils 148 and 150, $R_{xo}$ as noted previously is the resistivity of the flushed zone and is a known quantity from another logging tool measurement, $R_t$ is the corrected resistivity of the uninvaded zone. The longer lines of the chart are the diameters of the fluid invasion zones. Thus, data processing means 190 by determining the ratios of the coordinates of the chart FIG. 8 can locate itself within the chart to determine the diameter of the fluid invasion zone and the corrected resistivity of the univaded zone ($R_t$) when $R_{xo}$ is known.

Although the present invention as hereinbefore described utilizes the straightforward total magnetic field concept (i.e. that is where the receiver coils just receive whatever signals are propagated through the earth formation and provides signals accordingly). The present invention may also be utilized using the secondary field concept as set forth in U.S. application Ser. No. 586,465, filed Mar. 5, 1984, now U.S. Pat. No. 4,687,995.

What is claimed is:

1. A thin bed resistivity well logging system comprising:

means for transmitting electromagnetic energy into an earth formation from a first location in a borehole traversing the earth formation, at a frequency lying within a range of frequencies from 500 kilohertz through 4 megahertz, and means for determining the true resistivity of a thin strata of the earth formation corrected for fluid invasion in accordance with transmitted electromagnetic energy that has propagated through the earth formation to other locations in the borehole; and wherein the determining means includes:

first coil means for receiving propagated electromagnetic energy from the earth formation at a second location spaced a first predetermined distance from the first location and providing a signal representative thereof, second coil means for receiving propagated electromagnetic energy from the earth formation at a third location spaced a second predetermined distance from the first location and providing a signal representative thereof, third coil means for receiving a propagated electromagnetic energy from the earth formation at a fourth location spaced a third predetermined distance from the first location and providing a signal representative thereof, fourth coil means for receiving a propagated electromagnetic energy from the earth formation at a fifth location spaced a fourth predetermined distance from the first location and providing a signal representative thereof, means for deriving the true resistivity of the thin strata in accordance with the signals from the third and fourth coil means, and means for providing a signal corresponding to a corrected true resistivity for fluid invasion of the formation in accordance with the signals from all four coil means.

2. A system as described in claim 1 in which the first predetermined distance is 42 inches, the second predetermined distance is 48 inches, the third predetermined distance is 60 inches, and the fourth predetermined distance is 68 inches.

3. A system as described in claim 2 in which the corrected true resistivity signal means includes:

means connected to the third coil means and the fourth coil means for deriving signal $R_d$, where $R_d$ is the resistance determined from the phase difference between the third and fourth coil receiving means, means connected to the first and second coil receiving means for deriving the signal $R_m$, where $R_m$ is the resistance determined from the phase difference between the first and second coil receiving means, and means connected to the two last mentioned means for determining the corrected true resistance $R_t$ in accordance with the $R_d$, and $R_m$ signals and a predetermined resistance $R_{xo}$ of a fluid invaded zone.

4. A system as described in claim 3 in which the $R_t$ determining means also determines the diameter of fluid invaded zone.

5. A thin bed resistivity well logging method comprising the steps of:

transmitting electromagnetic energy into an earth formation from a first location in a borehole traversing the earth formation, at a frequency lying within a range of frequencies from 500 kilohertz through 4 megahertz, and determining the true resistivity of a thin strata of the earth formation corrected for fluid invasion in accordance with transmitted electromagnetic energy that has propagated through the earth formation to other locations in the borehole; and in which the determining step includes:

receiving propagated electromagnetic energy from the earth formation at a second location spaced a first predetermined distance from the first location and providing a first received signal representative thereof, receiving propagated electromagnetic energy from the earth formation at a third location spaced a second predetermined distance from the first location and providing a second received signal representative thereof, receiving a propagated electromagnetic energy from the earth formation at a fourth location spaced a third predetermined distance from the first location and providing a third received signal representative thereof, receiving a propagated electromagnetic energy from the earth formation at a fifth location spaced a fourth predetermined distance from the first location and providing a fourth received signal representative thereof, deriving a true resistivity of the thin strata in accordance with the third and fourth received signals, and means for providing a signal corresponding to a corrected true resistivity for fluid invasion of the formation in accordance with all four received signals.

6. A method as described in claim 5 in which the first predetermined distance is 42 inches, the second predetermined distance is 48 inches, the third predetermined distance is 60 inches, and the fourth predetermined distance is 66 inches.

7. A method as described in claim 6 in which the corrected true resistivity signal step includes:

deriving signals $R_d$ from the third and fourth received signals, and providing an $R_d$ signal where $R_d$ is the resistance determined from the phase difference between the third and fourth received signals, and deriving the resistance $R_m$ from the first and second received signals and providing an $R_m$ signal, and determining the corrected true resistance $R_t$ in accordance with the $R_d$, and $R_m$ signals and a predetermined resistance $R_{xo}$ of a fluid invaded zone.

8. A method as described in claim 7 in which the $R_t$ determining means also determines the diameter of fluid invaded zone in accordance with the $R_d$, $R_m$ and $R_{xo}$.

* * * * *